United States Patent
Harutyunyan et al.

(10) Patent No.: US 12,435,221 B2
(45) Date of Patent: Oct. 7, 2025

(54) FORMATION OF ENCAPSULATED NANORIBBONS IN DIELECTRIC NANOTUBES

(71) Applicant: HONDA MOTOR CO., LTD., Tokyo (JP)

(72) Inventors: Avetik R. Harutyunyan, Stoneham, MA (US); Xufan Li, Fremont, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 7 days.

(21) Appl. No.: 18/455,966

(22) Filed: Aug. 25, 2023

(65) Prior Publication Data
US 2024/0067827 A1 Feb. 29, 2024

Related U.S. Application Data

(60) Provisional application No. 63/402,270, filed on Aug. 30, 2022.

(51) Int. Cl.
| | |
|---|---|
| *C09C 3/06* | (2006.01) |
| *C09C 1/00* | (2006.01) |
| *C23C 16/34* | (2006.01) |
| *C23C 16/44* | (2006.01) |
| *H01B 3/02* | (2006.01) |

(52) U.S. Cl.
CPC .............. *C09C 1/0003* (2013.01); *C09C 3/06* (2013.01); *C23C 16/342* (2013.01); *C23C 16/4417* (2013.01); *H01B 3/02* (2013.01); *C01P 2004/03* (2013.01); *C01P 2004/04* (2013.01); *C01P 2004/13* (2013.01); *C01P 2006/40* (2013.01)

(58) Field of Classification Search
CPC ....... C09C 1/0003; C09C 3/06; C23C 16/342; C23C 16/4417; C23C 16/305; C23C 16/448; H01B 3/02; C01P 2004/03; C01P 2004/04; C01P 2004/13; C01P 2006/40; C01P 2002/70; C01P 2004/17; C01P 2004/80; B82Y 30/00; B82Y 40/00; C01B 21/0648; C01G 39/06
See application file for complete search history.

(56) References Cited

U.S. PATENT DOCUMENTS

2022/0276325 A1\* 9/2022 Shi ........................... G01J 4/00

OTHER PUBLICATIONS

Chuvilin et al., "Self-assembly of a sulphur-terminated graphene nanoribbon within a single-walled carbon nanotube," Nature Materials, 10, pp. 687-692,(2011) (Year: 2011).\*

(Continued)

*Primary Examiner* — Mark Kopec
*Assistant Examiner* — Jaison P Thomas
(74) *Attorney, Agent, or Firm* — ArentFox Schiff LLP; Mark Duell

(57) ABSTRACT

An encapsulated nanoribbon having a nanotube of a dielectric material, wherein the nanotube has a diameter and a first length, and a nanoribbon at least partially encapsulated within the nanotube, the nanoribbon including a transition metal dichalcogenide and having a width and a second length, the second length being coextensive with the first length, and the width being no greater than the diameter. Also disclosed are methods of making the encapsulated nanoribbon.

13 Claims, 12 Drawing Sheets

(56) References Cited

OTHER PUBLICATIONS

Lee, Y., et al. "Recent progress in realizing novel one-dimensional polymorphs via nanotube encapsulation" Nano Convergence ,11 , pp. 1-21 (2024) (Year: 2024).*

Ajayi et al., "Approaching the intrinsic photoluminescence linewidth in transition metal dichalcogenide monolayers," 2D Materials, 2017, vol. 4, 17 pages.

Arora et al., "Superconductivity in metallic twisted bilayer graphene stabilized by WSe2," Nature, 2020, vol. 583, pp. 379-384.

Cadiz et al., "Excitonic Linewidth Approaching the Homogeneous Limit in MoS2-Based van der Waals Heterostructures," Physical Review X, 2017, vol. 7, No. 021026, 12 pages.

Cain et al., "Ultranarrow TaS2 Nanoribbons," Nano Letters, 2021, vol. 21, No. 7, pp. 3211-3217.

Cao et al., "Unconventional superconductivity in magic-angle graphene superlattices," Nature, 2018, vol. 556, pp. 43-50.

Cui et al., "Multi-terminal transport measurements of MoS2 using a van der Waals heterostructure device platform," Nature Nanotechnology, 2015, vol. 10, No. 6, pp. 534-540.

Li et al., "Nickel particle-enabled width-controlled growth of bilayer molybdenum disulfide nanoribbons," Science Advances, 2021, vol. 7, No. 50, 8 pages.

Qin et al., "Raman response and transport properties of tellurium atomic chains encapsulated in nanotubes," Nature Electronics, Mar. 2020, vol. 3, pp. 141-147.

Wang et al., "Correlated electronic phases in twisted bilayer transition metal dichalcogenides," Nature Materials, 2020, vol. 19, pp. 861-866.

Wang et al., "Mixed Low-Dimensional Nanomaterials: 2D Ultranarrow MoS2 Inorganic Nanoribbons Encapsulated in Quasi-1D Carbon Nanotubes," Journal of the American Chemical Society, 2010, vol. 132, No. 39, pp. 13840-13847.

Wang et al., "Ultra-narrow WS2 nanoribbons encapsulated in carbon nanotubes," Journal of Materials Chemistry, 2011, vol. 21, pp. 171-180.

\* cited by examiner

FORMATION OF ENCAPSULATED NANORIBBONS IN DIELECTRIC NANOTUBES

CROSS-REFERENCE TO RELATED APPLICATIONS

This application claims priority to U.S. Application No. 63/402,270, filed on Aug. 30, 2022, the contents of which are expressly incorporated herein in their entirety.

TECHNICAL FIELD

The present disclosure is directed nanoribbons encapsulated within a nanotube including a dielectric material.

BACKGROUND

Atomically-thin materials including graphene and transition metal dichalcogenides are promising building blocks for numerous developing applications. However, these extremely thin layers are vulnerable to any weak external perturbations, which can alter or impair their intrinsic properties. It may therefore be desirable to encapsulate such materials.

Recently, nanoribbons provided within carbon nanotubes (CNTs) have been reported. However, as CNTs are conductive, they generally short a circuit incorporating the same. In addition, CNTs often screen the optical emission from the nanoribbons, rendering any study of their properties impossible. On the other hand, current methods using insulating materials rely on mechanical exfoliation and stacking. Although the dry-transfer method has been developed, chemical residues from assisting polymers (e.g., polydimethylsiloxane) are still inevitable.

Moreover, synthesis of ultranarrow graphene and transition metal dichalcogenide nanoribbons within nanotubes introduces an additional degree of freedom (i.e., width confinement) in engineering the already rich electronic and optical behaviors of two-dimensional materials. As reduction of the width also increases the sensitivity and vulnerability of such materials to external environments, leading to faster property decay, encapsulation of such an ultranarrow nanoribbon inside a nanotube including a dielectric material could isolate the nanoribbon from external environments and thereby protect it from property decay.

SUMMARY

The present disclosure is directed to an encapsulated nanoribbon, the encapsulated nanoribbon including a nanotube including a dielectric material, wherein the nanotube has a diameter and a first length, and a nanoribbon at least partially encapsulated within the nanotube, the nanoribbon including graphene or a transition metal dichalcogenide, wherein the nanoribbon has a width and a second length, the second length being coextensive with the first length, and wherein the width is no greater than the diameter.

Also disclosed herein are methods of making the encapsulated nanoribbons of the present disclosure. In some non-limiting examples, the method may include reacting an encapsulated first precursor within an encapsulating material to provide an encapsulated nanoribbon. In other non-limiting examples, the method may include heating at least a first precursor in the presence of an encapsulating material to an elevated temperature for a time period sufficient to form an encapsulated nanoribbon.

DETAILED DESCRIPTION

Figure 1A:
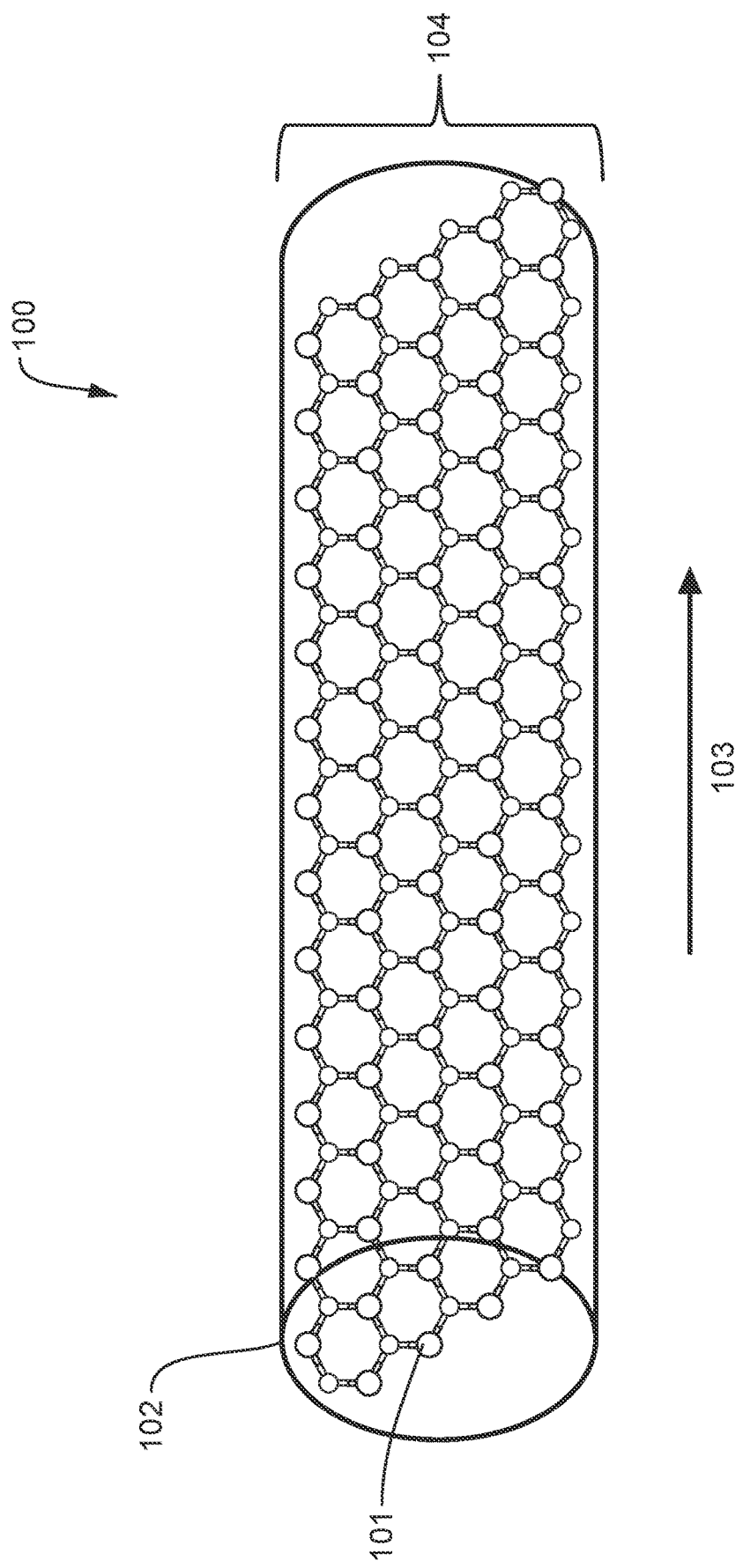
FIG. 1A shows an example encapsulated nanoribbon having a zigzag edge structure, as described herein.

The present disclosure is directed to an encapsulated nanoribbon, particularly encapsulated nanoribbons and/or encapsulated nanoribbons including one or more transition metal dichalcogenides (TMDs). According to some aspects, the nanoribbon may be encapsulated within a nanotube including a dielectric material. The present disclosure is also directed to methods of making the encapsulated nanoribbons as described herein.

As used herein, the term "ribbon" refers to an elongated structure, that is, a structure with a length-to-width ratio of greater than 500, optionally greater than 1000. As used herein, the term "nanoribbon" refers to a ribbon with at least one dimension on the nanoscale, for example, a ribbon having a width of between about 1 and 100 nm. According to some aspects, the nanoribbons of the present disclosure may be atomically-thin. The nanoribbons may each have a single atomic layer, two atomic layers, three atomic layers, four atomic layers, or more, wherein each of the layers is the same as or different from another layer encompassed by the nanoribbon.

According to some aspects, the nanoribbons according to the present disclosure may have a material useful for nanoelectronic applications, including one or more TMDs. Example TMDs include, but are not limited to, molybdenum disulfide ($MoS_2$), tungsten disulfide ($WS_2$), molybdenum diselenide ($MoSe_2$), and tungsten diselenide ($WSe_2$). Additionally or alternatively, the nanoribbons according to the present disclosure may include one or more carbon allotropes such as graphene.

The nanoribbon according to the present disclosure may be atomically-thin. As used herein, the term "atomically-thin" may mean two-dimensional, or having a thickness of between about 1 and 10 nm. The nanoribbon according to the present disclosure may be encapsulated within a nanotube including a dielectric material. As used herein, the term "dielectric" refers to the property of transmitting electric force without conduction. According to some aspects, the dielectric material may have hexagonal boron nitride (hBN).

As used herein, the term "nanotube" refers to a tube having at least one dimension on the nanoscale, that is, at least on dimension between about 0.6 and 100 nm. It should be understood that a tube as described herein has at least a length dimension and a diameter dimension. According to some aspects, a nanotube may have a tube having a diameter on the nanoscale.

According to some aspects, the nanoribbon according to the present disclosure may be encapsulated within the nanotube as described herein such than the length of the nanoribbon is coextensive with the length of the nanotube. In this example, certain dimensions of the nanoribbon may be limited by dimensions of the nanotube. For example, the nanotube may have an inner diameter, and the nanoribbon may have a first width and/or a first thickness that is no greater than the inner diameter. It should be understood that the thickness of a nanoribbon may be at least partially dependent on the number of atomic layers encompassed by the nanoribbon, as described herein.

According to some aspects, the nanotube may have an inner diameter that is no more than about 100 nm, optionally no more than about 10 nm, optionally no more than about 5 nm, and optionally no more than about 1 nm. According to some aspects, the nanotube may have an inner diameter that is between about 1 nm and 100 nm, optionally between about 1 nm and 50 nm, and optionally between about 1 nm and 10 nm, and optionally between 1 nm and 5 nm.

According to some aspects, the nanotube may have a length that is between about 0.1 µm and 50 µm, optionally between about 1 µm and 20 µm, and optionally between about 2 µm and 5 µm FIG. 1A shows an example of an encapsulated nanoribbon 100 as described herein. As shown in FIG. 1A, nanoribbon 101 may be encapsulated within a nanotube 102 such that the length of nanoribbon 101 and the length of nanotube 102 are coextensive in a first direction 103. In this example, nanotube 102 has a first diameter 104 that is lateral with respect to first direction 103. As shown in FIG. 1A, nanoribbon 101 has a first width that is no greater than the first diameter 104. According to some aspects, nanoribbon 101 may have a first width that is about the same as first diameter 104.

According to some aspects, the nanotube of the present disclosure may be chiral, that is, the nanotube may have an atomic structure such that it and its mirror image cannot be superimposed. In the case wherein the nanotube has hBN, the nanotube's chirality may be expressed in terms of its chiral indices (n,m), as known in the art. According to some aspects, the nanotube may be a zigzag nanotube or an armchair nanotube. It should be understood, however, that the nanotubes according to the present disclosure are not necessarily limited in this way.

Figure 1B:
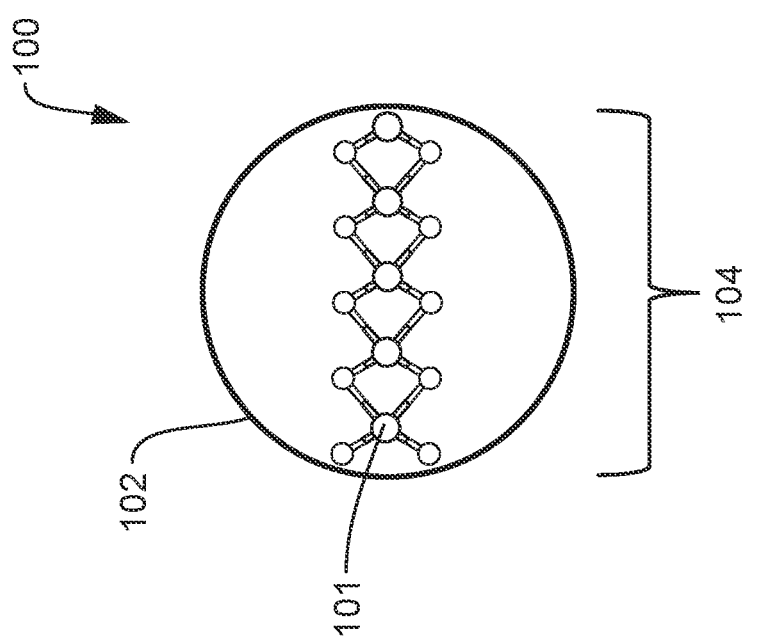
FIG. 1B shows an end view of the encapsulated nanoribbon shown in FIG. 1A.

According to some aspects, the nanoribbons according to the present disclosure may have an edge structure that corresponds with the chirality of the nanotube in which the nanoribbon is encapsulated. For example, FIG. 1B shows a side view of the encapsulate nanoribbon 100 as shown in FIG. 1A. In this example, nanotube 102 may be a zigzag nanotube such that nanoribbon 101 may have a zigzag edge structure as shown. FIG. 2B shows another example of an encapsulated nanoribbon 200, similar to encapsulated nanoribbon 100 as shown in FIG. 1A. In particular, as shown in FIG. 2A, encapsulated nanoribbon 200 may have a nanoribbon 201 encapsulated within a nanotube 202 such that the length of nanoribbon 201 and the length of nanotube 202 are coextensive in a first direction 203.

Figure 2A:
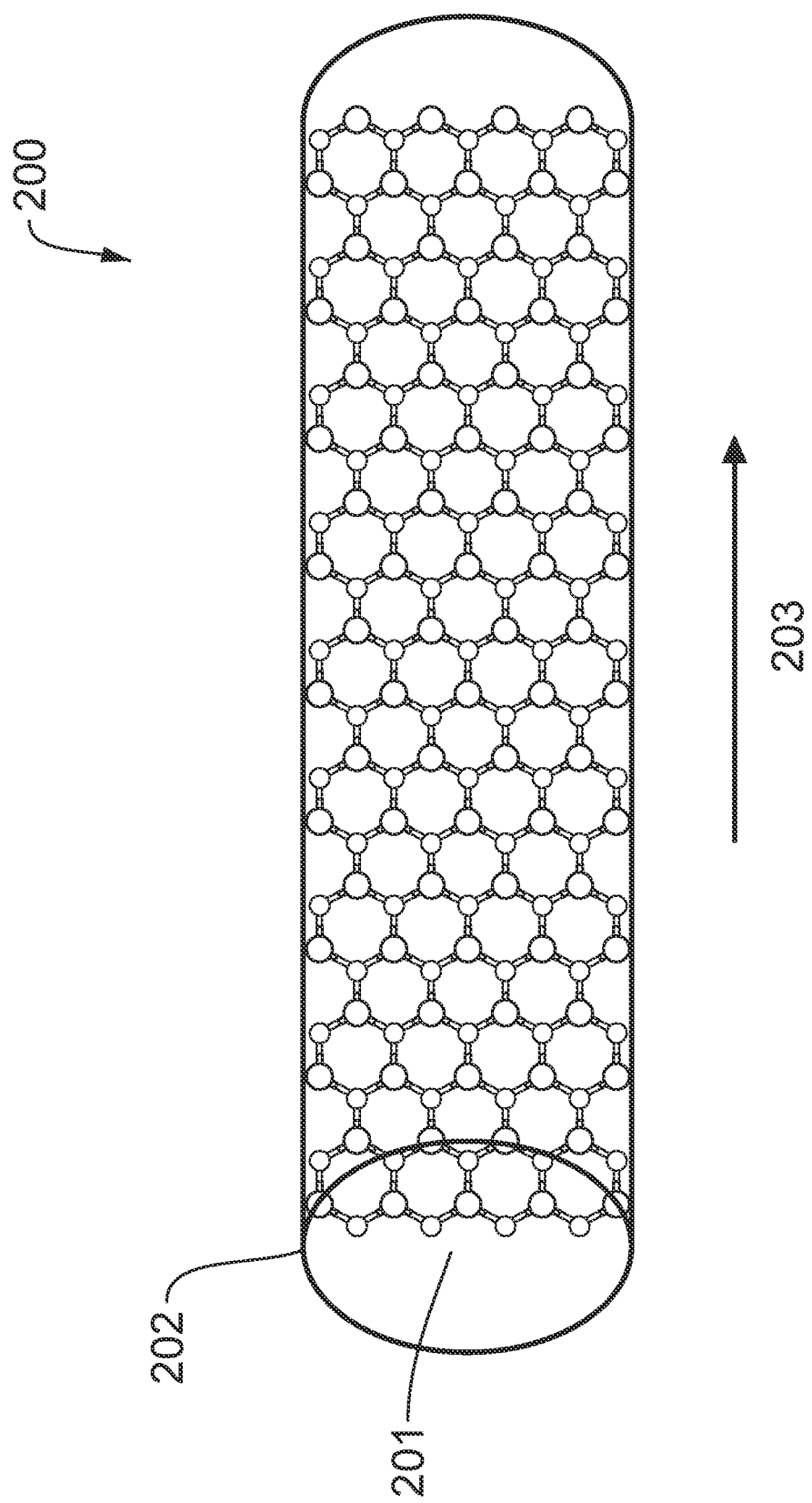
FIG. 2A shows an example encapsulated nanoribbon having an armchair edge structure, as described herein.
Figure 2B:
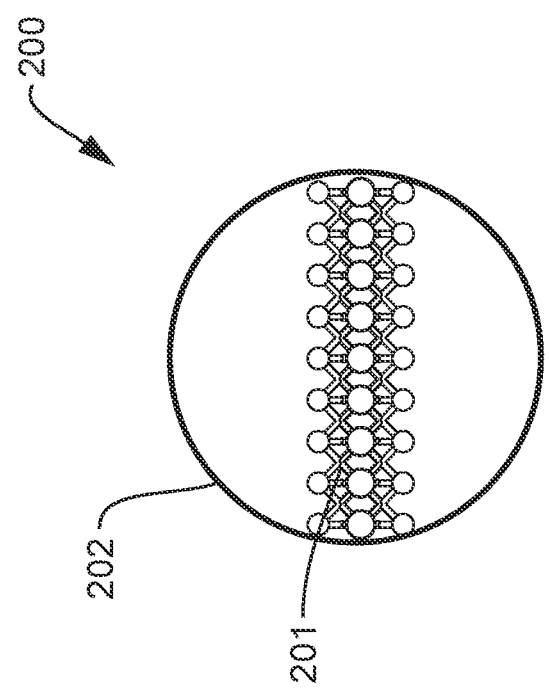
FIG. 2B shows an end view of the encapsulated nanoribbon shown in FIG. 2A.

FIG. 2B shows a side view of the encapsulate nanoribbon 200 as shown in FIG. 2A. In this example, nanotube 202 may be an armchair nanotube such that nanoribbon 201 may have an armchair edge structure as shown.

The present disclosure is also directed to methods of making the encapsulated nanoribbons as described herein. According to some aspects, the method may include providing a nanotube as described herein and growing a nanoribbon within the nanotube.

According to some aspects, proving a nanotube may include synthesizing a nanotube including hBN (also referred to herein as a BNNT) as known in the art. In some non-limiting examples, the BNNT may be synthesized via an arc discharge method, a ball-milling method, a chemical vapor deposition method, a laser ablation method, a thermal plasma jet method, or a combination thereof. The method may optionally include purifying the BNNT and/or opening one or both ends of the BNNT as known in the art.

The method according to the present disclosure may include growing a nanoribbon within a nanotube, such as within a BNNT as described herein. In one non-limiting example, the nanoribbon may be grown as described in, for example, Li, X. et al., Nickel particle—enabled width-controlled growth of bilayer molybdenum disulfide nanoribbons. Sci. Adv. 2021, 7, abk1892, the contents of which are incorporated by reference herein in their entirety. In another example, the nanoribbon may be grown as described in, for example, U.S. Patent Publication No. 2022/0106681, the contents of which are incorporated by reference herein in their entirety.

According to some aspects, the method may include simultaneously synthesizing a nanotube and a nanoribbon encapsulated therein.

Figure 3A:
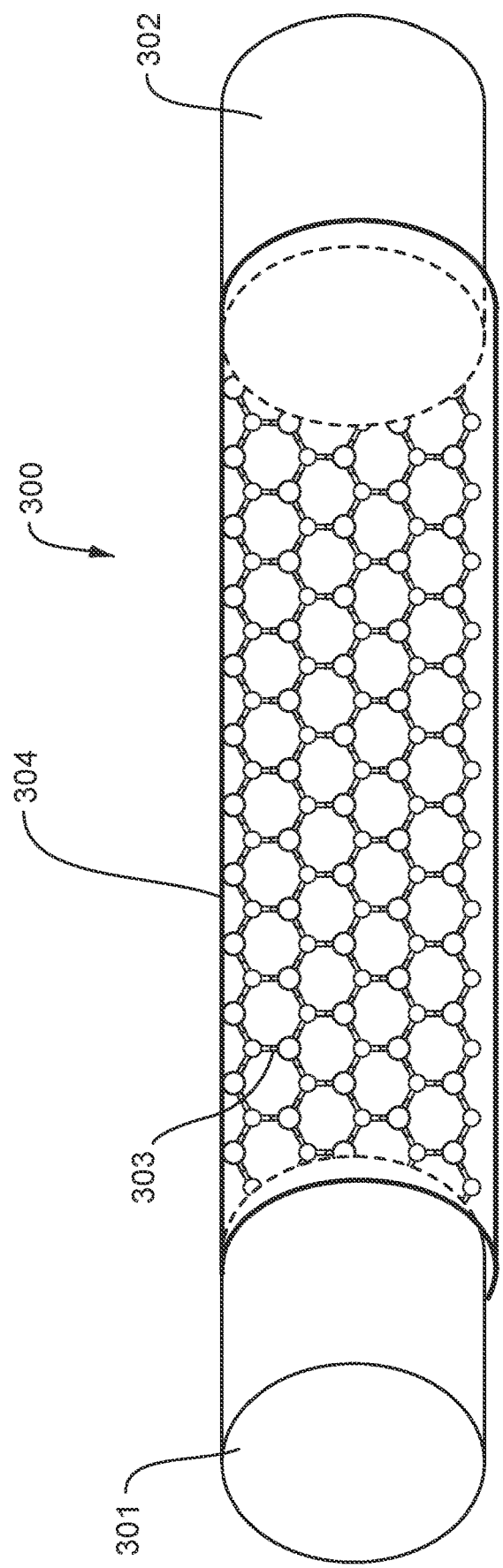
FIG. 3A shows an example encapsulated nanoribbon attached to electrodes as described herein.

According to some aspects, the method may further include providing one or more electrodes in electrical connection with one or more ends of a nanoribbon and with the wall of the encapsulating nanotube (i.e., a BNNT) as described herein. For example, FIG. 3A shows an encapsulated nanoribbon 300 as described herein having a first metal electrode 301 (as a source) and a second metal electrode 302 (as a drain) attached to first and seconds ends of nanoribbon 303. As shown in FIG. 3A, at least a portion of first metal electrode 301 and/or second metal electrode 302 may be provided within the encapsulating nanotube 304. In this way, nanoribbon 303 may be fully encapsulated by encapsulating nanotube 304 when encapsulated nanoribbon 300 is incorporated into electrical and/or optical devices, thus reducing or eliminating the nanoribbon's sensitivity and vulnerability to external environments.

It should be understood that FIG. 3A shows a field-effect transistor (FET) device with nanoribbon 303 as the semiconducting channel, first metal electrode 301 and second metal electrode 302 as the source and drain electrodes, respectively, and encapsulating nanotube 304 as the dielectric layer.

Figure 3B:
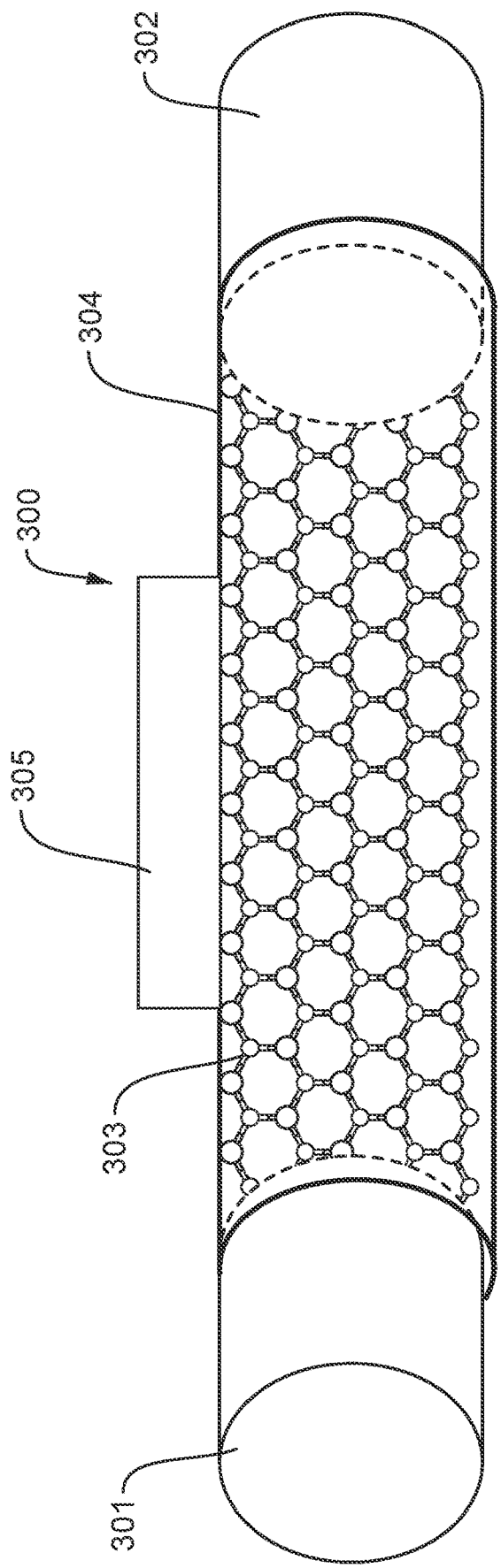
FIG. 3B shows an example encapsulated nanoribbon attached to electrodes as described herein.

FIG. 3B shows a device similar to that of FIG. 3A and also having a third metal electrode 305 (as a gate) attached to the wall of encapsulating nanotube 304. That is, FIG. 3B shows an FET device with nanoribbon 303 as the semiconducting channel, first metal electrode 301 and second metal electrode 302 as source and drain electrodes, respectively, encapsulating nanotube 304 as the dielectric layer, and third metal electrode 305 as the gate electrode.

Example metals useful for first metal electrode 301, second metal electrode 302, and third metal electrode 305 include, but are not limited to, Ti, Ni, Ag, Au, Pd, Pt, Bi, In, Sc, and combinations thereof, wherein each of the metal electrodes independently includes the same metal as another metal electrode or a different metal from another metal electrode.

In some non-limiting examples, the method of the present disclosure may include one or more solvent-based synthesis steps. Additionally or alternatively, the method may include one or more dry, vapor-based synthesis steps.

In some non-limiting examples, the method may include encapsulating a first precursor within an encapsulating material, such as a nanotube, and reacting the encapsulated first precursor with the vapor from a second precursor to provide an encapsulated nanoribbon as described herein.

According to some aspects, encapsulating a first precursor within an encapsulating material, such as a nanotube, may include one or more solvent-based synthesis steps. In some non-limiting examples, the method may include providing an encapsulating material as described herein (e.g., a plurality of BNNTs) dispersed in a solvent (referred to herein as an encapsulating material solution), combining the encapsulating material solution with one or more first precursors to provide a combined solution, and heating the combined solution in a reflux process such that the first precursor is encapsulated within the encapsulating material, thus providing the encapsulated first precursor.

According to some aspects, the solvent may include one or more organic solvents. Non-limiting examples of organic solvents useful according to the present disclosure include dimethylformamide (DMF), dimethyl sulfoxide (DMSO), tetrahydrofuran (THF), and combinations thereof.

It should be understood that the one or more first precursors may be suitable for providing a selected nanoribbon as described herein. For example, in the case wherein the selected nanoribbon includes a TMD, the one or more first precursors may include a transition metal, such as molybdenum (Mo) and/or tungsten (W). In this example, the one or more first precursors may be selected from ammonium salts and/or sodium salts containing the transition metal.

For example, in the case wherein the selected TMD includes $MoS_2$ and/or $MoSe_2$, the one or more first precursors may include ammonium tetrathiomolybdate (($NH_4)_2MoS_4$), ammonium molybdate (($NH_4)_6Mo_7O_{24}$), sodium molybdate ($Na_2MoO_4$), or a combination thereof. In another example wherein the selected TMD includes $WS_2$ and/or $WSe_2$, the one or more first precursors may include ammonium tetrathiotungstate (($NH_4)_2WS_4$), ammonium tungstate (($NH_4)_6W_7O_{24}$), sodium tungstate ($Na_2WO_4$), or a combination thereof.

According to some aspects, each of the one or more first precursors may be combined with the encapsulating material solution simultaneously. Additionally or alternatively, each of the one or more first precursors may be combined with the encapsulating material solution sequentially with respect to another first precursor. Each of the one or more first precursors may be combined with the encapsulating material solution in a dry state (e.g., as a powder) or as a solution having a solvent selected from an organic solvent, water, or a combination thereof.

In one non-limiting example, combining the encapsulating material solution with one or more first precursors may include dissolving the first precursor in the encapsulating material solution, combining the encapsulating material solution with an aqueous first precursor solution, or a combination thereof.

According to some aspects, the method may include combining the encapsulating material solution and the one or more first precursors such that the ratio of encapsulating material to each of the one or more first precursors is between about 10:1 to 1:10, optionally between about 10:1 to 1:1, and optionally between about 1:10 to 1:1, including any value therebetween.

The method may further include heating the combined solution (i.e., the combination of the encapsulating material solution and the one or more first precursors) to an elevated temperature in a reflux process for a time period sufficient to provide an encapsulated first precursor as described herein. According to some aspects, the elevated temperature may be between about 80 and 180° C., optionally between about 90 and 170° C., optionally between about 100 and 160° C., optionally between about 110 and 150° C., optionally between about 120 and 140° C., and optionally about 130° C.

In some non-limiting examples, the time period for the reflux process may be between about 1 and 3 hours, optionally between about 1.5 and 2.5 hours, optionally between about 1.25 and 2.25 hours, and optionally about 2 hours. In some non-limiting examples, the combined solution may be heated to the elevated temperature under reflux for all or a portion of the time period.

The method may further include isolating the encapsulated first precursor from the solution and/or providing the encapsulated first precursor as a powder. For example, the method may include one or more of centrifugation, washing (e.g., with an alcohol, such as isopropyl alcohol), and/or drying (e.g., under vacuum) sufficient to provide dry encapsulated first precursor. It should be understood that a sequence of centrifugation, washing, and/or drying may be performed one time, two times, three times, or more times.

The method may further include reacting the encapsulated first precursor with a second precursor to provide an encapsulated nanoribbon as described herein. It should be understood that the second precursor may be suitable for providing a selected nanoribbon as described herein. For example, in the case wherein the selected nanoribbon includes a TMD, the second precursor may include a chalcogen (e.g., sulfur (S), selenium (Se), or a combination thereof). In some non-limiting examples, the second precursor may be provided as a powder.

According to some aspects, reacting the encapsulated first precursor with the second precursor may include contacting the encapsulated first precursor with a vaporized second precursor at an elevated temperature for a time period sufficient for the first precursor and the second precursor to react within the encapsulating material, thus providing an encapsulated nanoribbon.

Figure 4:
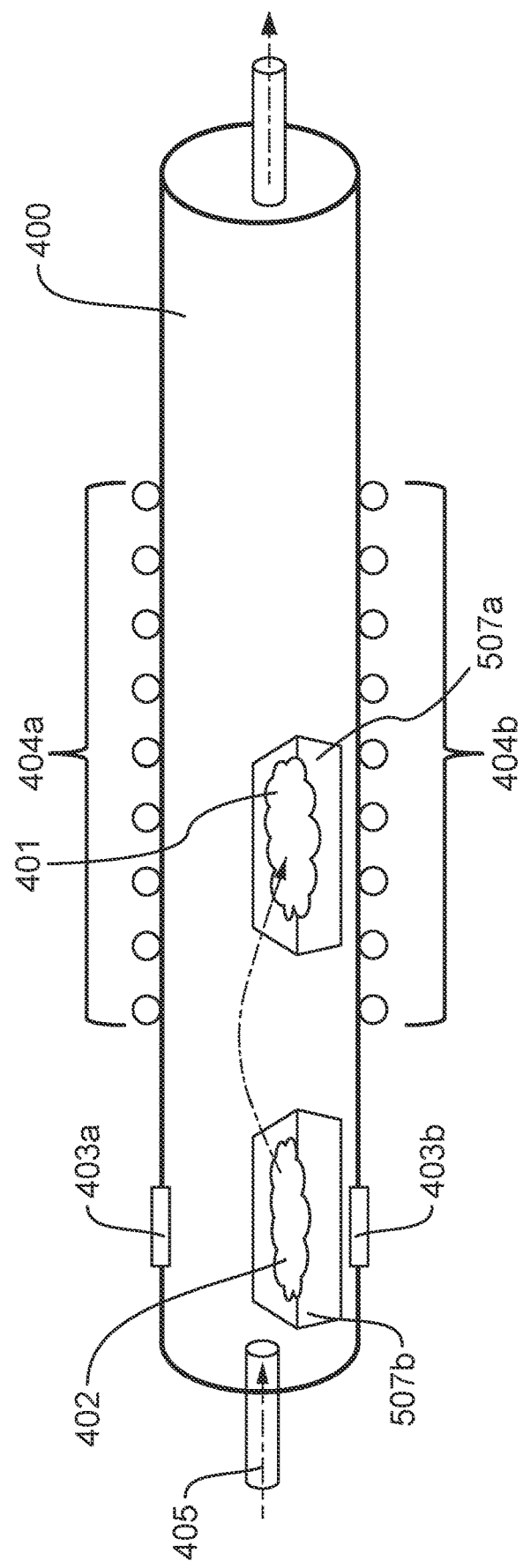
FIG. 4 shows an example schematic for reacting an encapsulated first precursor inside a nanotube with the vapor from a second precursor, according to aspects of the present disclosure.

FIG. 4 shows an example schematic for reacting an encapsulated first precursor with a second precursor as described herein. In particular, FIG. 4 shows powders of a nanotube-encapsulated first precursor 401 (e.g., the encapsulated first precursor powder as described herein) and a second precursor powder 402 (e.g., the second precursor as described herein) provided in a heating apparatus 400. In some non-limiting examples, the heating apparatus may include a quartz tube provided with one or more heating mechanisms. Example heating mechanisms include, but are not limited to, heating wires, heating belts, and any mechanism capable of providing the elevated temperature(s) as describe herein. As shown in FIG. 4, each of nanotube-encapsulated first precursor powder 401 and second precursor powder 402 may be provided in first container 407a and second container 407b, respectively. As used herein, a container may be any container suitable for the methods as described herein, including crucibles, boats, and the like. Containers may include a metal, such as aluminum, graphite, quartz, and combinations thereof, as known in the art.

FIG. 4 shows one non-limiting heating apparatus 400 having a first heating mechanism, first heating mechanism including heating belts 403a, 403b. Heating belts 403a, 403b may be proximal second precursor powder 402. FIG. 4 also shows a second heating mechanism including a plurality of heating wires 404a, 404b proximal nanotube-encapsulated first precursor powder 401. However, it should be understood that heating apparatus 400 is not necessarily limited to this arrangement. For example, heating belts 403a, 403b and/or heating wires 404a, 404b may be replaced by or supplemented with other heating mechanisms as described herein.

According to some aspects, the heating apparatus 400 may be such that second precursor powder 402 and nanotube-encapsulated first precursor powder 401 may be independently heated, that is, such that second precursor powder 402 and nanotube-encapsulated first precursor powder 401 are heated to different temperatures. It should also be understood that while FIG. 4 shows heating mechanisms provided above and below second precursor powder 402 and nanotube-encapsulated first precursor powder 401, the heating mechanism(s) may be provided in any position relative to second precursor powder 402 and nanotube-encapsulated first precursor powder 401 sufficient to provide the elevated temperature(s) as described herein.

The method may include heating second precursor powder 402 to a first elevated temperature sufficient to provide a vapor of second precursor powder 402. For example, in the case where second precursor powder 402 includes a chalcogen, the method may include heating second precursor powder 402 to a first temperature sufficient to provide a chalcogen vapor atmosphere. According to some aspects, the first temperature may be between about 100 and 300° C., and optionally about 200° C. According to some aspects, the first temperature may be between about 300 and 500° C., and optionally about 400° C.

According to some aspects, the vapor may be provided proximal to nanotube-encapsulated first precursor powder 401. For example, as shown in FIG. 4, gas flow 405 may drive the vapor such that it provides an atmosphere at least partially surrounding nanotube-encapsulated first precursor powder 401. According to some aspects, gas flow 405 may include one or more inert gases, such as Ar, $N_2$, or He, or a combination thereof. According to some aspects, gas flow 405 may include the combination of one inert gas and one reactive gas, such as $H_2$. Each of the gases may be provided at a certain flow rate. Additionally or alternatively, each of the gases may independently be provided at a flow rate that is different from the flow rate of at least one other gas. According to some aspects, the flow rate of inert gas may be between about 60 and 100 sccm, optionally between about 70 and 90 sccm, and optionally about 80 sccm. According to some aspects, the flow rate of reactive gas may be between about 1 and 20 sccm, optionally between about 1 and 10 sccm, and optionally about 5 or 6 sccm.

The method may include heating nanotube-encapsulated first precursor powder 401 in the presence of the vapor atmosphere to an elevated temperature for a time period sufficient to provide an encapsulated nanoribbon as described herein. In some non-limiting examples, the elevated temperature may be between about 700 and 1100° C., optionally between about between about 800 and 1000° C., optionally between about 850 and 950° C., and optionally about 900° C. In some non-limiting examples, the time period may be between about 1 and 90 minutes, optionally between about 1 and 60 minutes, optionally between about 15 and 45 minutes, and optionally about 30 minutes.

It should be understood, however, that the method of the present disclosure is not necessarily limited to the above example. For example, the method may include forming a nanoribbon within an encapsulating material, for example, within a nanotube. In one non-limiting example, the method may include reacting a first precursor and a second precursor as described herein within an encapsulating material to provide an encapsulated nanoribbon. According to some aspects, the first precursor may include a transition metal as described herein, such as a transition metal oxide. Non-limiting examples of transition metal oxides include $MoO_2$, $MoO_3$, $WO_2$, $WO_3$, and combinations thereof. The second precursor may include a chalcogen as described herein.

According to some aspects, the method may include heating to vaporize the first precursor and the second precursor in the presence of an encapsulating material as described herein for a time period sufficient for the vapor of the first precursor and the second precursor to react within the encapsulating material to provide an encapsulated nanoribbon.

Figure 5:
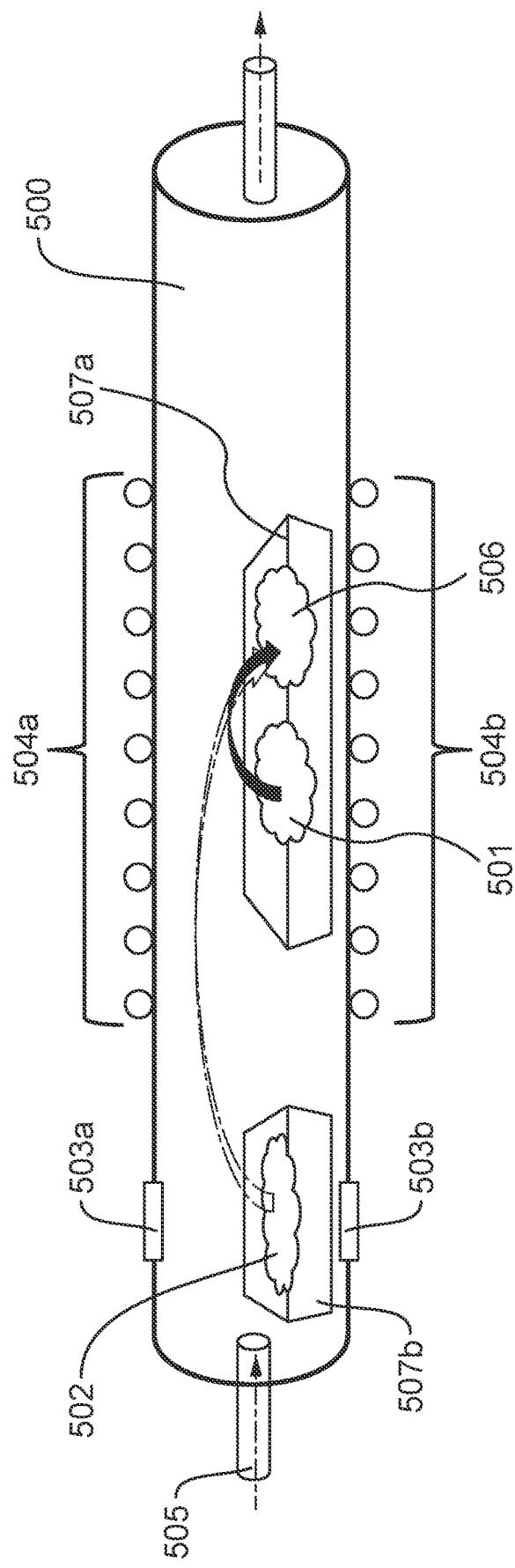
FIG. 5 shows an example method of reacting the vapor from a first precursor and the vapor from a second precursor within a nanotube, according to aspects of the present disclosure.

FIG. 5 shows one example method which includes reacting a first precursor and a second precursor within an encapsulating material to provide an encapsulated nanoribbon. In particular, FIG. 5 shows a heating apparatus 500 similar to heating apparatus 400 as described in relation to FIG. 4, including heating belts 503a, 503b and/or heating wires 504a, 504b.

As shown in FIG. 5, the method may include providing a first precursor powder 501 and a second precursor powder 502 within heating apparatus 500, similar to the example shown in FIG. 4. In this example, first precursor powder 501 may include a transition metal, as described herein. In some non-limiting examples, the transition metal may be provided as a transition metal oxide. In this example, second precursor power 502 may include a chalcogen as described herein.

This example may further include an encapsulating material powder 506, such as a nanotube powder. As shown in FIG. 5, encapsulating material powder 506 may be provided in the same first container 507a as first precursor powder 501, first container 507a being separate from a second container 507b containing second precursor powder 502. However, it should be understood that the method is not necessarily limited in this way. For example, the method may include a third container containing encapsulating material powder 506.

In this example, the method may include heating second precursor powder 502 to a first elevated temperature sufficient to provide a vapor of second precursor powder 502 as described herein. For example, in the case where second precursor powder 502 includes a chalcogen, the method may include heating second precursor powder 502 to a first temperature sufficient to provide a chalcogen vapor atmosphere. According to some aspects, the first temperature may be between about 100 and 300° C., and optionally about 200° C. According to some aspects, the first temperature may be between about 300 and 500° C., and optionally about 400° C.

According to some aspects, the vapor of second precursor powder 502 may be provided proximal first precursor powder 501. For example, as shown in FIG. 5, a gas flow 505 may drive the vapor of second precursor powder 502 such that it provides an atmosphere at least partially surrounding first precursor powder 501. Similar to the example shown in FIG. 4, according to some aspects, gas flow 505 may include one or more inert gases, such as Ar, $N_2$, or He, or a combination thereof. According to some aspects, gas flow 505 may include the combination of one inert gas and one reactive gas, such as $H_2$. Each of the gases may be provided at a certain flow rate. Additionally or alternatively, each of the gases may be independently be provided at a flow rate that is different from the flow rate of at least one other gas. According to some aspects, the inert gas flow rate may be between about 60 and 100 sccm, optionally between about 70 and 90 sccm, and optionally about 80 sccm. According to some aspects, the reactive gas flow rate may be between about 1 and 20 sccm, optionally between about 1 and 10 sccm, and optionally about 5 or 6 sccm.

The method may include heating first precursor powder 501 in the presence of the vapor of second precursor powder 502 to an elevated temperature to provide a vapor of first precursor powder 501. In this way, the vapor of first precursor powder 501 and the vapor of second precursor powder 502 may react to provide a nanoribbon precursor vapor. For example, in the case wherein the nanoribbon is to include a TMD, the nanoribbon precursor vapor may include a TMD species. It should be understood that due to gas flow 505, the nanoribbon precursor vapor may be directed toward encapsulating material powder 506, thus providing a vapor atmosphere partially surrounding encapsulating material powder 506.

According to some aspects, the nanoribbon precursor vapor may be heated to the elevated temperature fort a time period sufficient to provide an encapsulated nanoribbon as described herein. In some non-limiting examples, the elevated temperature may be between about 500 and 1100° C., optionally between about between about 600 and 1000° C., optionally between about 650 and 950° C., and optionally between about 700 and 900° C. In some non-limiting examples, the time period may be between about 1 and 90 minutes, optionally between about 1 and 60 minutes, optionally between about 15 and 45 minutes, and optionally about 30 minutes.

In another non-limiting example, the method may include providing a first precursor, such as a TMD, and heating the first precursor in the presence of an encapsulating material in a reduced pressure environment for a time period sufficient to provide an encapsulated nanoribbon. As used herein, the term "reduced temperature environment" refers to an environment having a pressure that is below 1 atmosphere.

Figure 6:
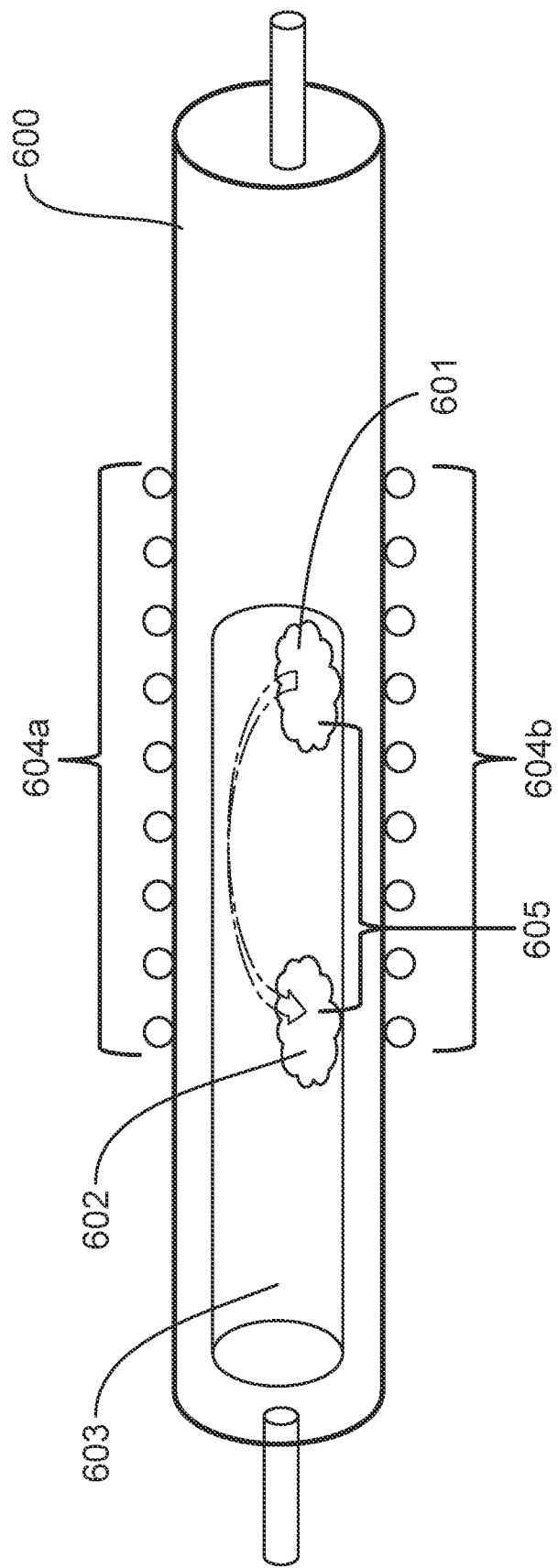
FIG. 6 shows an example method of forming an encapsulated nanoribbon inside a nanotube through vaporizing the precursor, according to aspects of the present disclosure.

FIG. 6 shows an example method which includes forming a nanoribbon within an encapsulating material, e.g., within a nanotube. In this example, a first precursor powder 601 and an encapsulating material powder 602 may be provided within a heating apparatus 600 similar to heating apparatuses 400 and 500 as described in relation to FIG. 4 and FIG. 5, respectively. In this example, first precursor powder 601 may include a TMD powder, as described herein. As shown in FIG. 6, first precursor powder 601 and encapsulating material powder 602 may be provided a certain distance 605 from each other within a sealed containment 603, such as a quartz tube. Distance 605 may be, for example, between about 0.01 and 10 cm, and optionally between about 0.5 and 5 cm. Sealed containment 603 may be sealed under a reduced pressure, such as between about $10^{-3}$ to $10^{-6}$ Torr.

The method may include heating first precursor powder 601 and encapsulating material powder 602 to an elevated temperature for a time period sufficient to form a nanoribbon of the first precursor within the encapsulating material. In the example shown in FIG. 6, the elevated temperature may be provided by heating the heating apparatus 600 as described herein, such as via heating wires 604a, 604b. In this example, the elevated temperature may be between about 500 and 1400° C., optionally between about between about 600 and 1300° C., optionally between about 650 and 1250° C., and optionally between about 700 and 1200° C. In some non-limiting examples, the time period may be between about 1 and 24 hours, optionally between about 1 and 12 hours.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Herein, the recitation of numerical ranges by endpoints (e.g. between about 50:1 and 1:1, between about 100 and 500° C., between about 1 minute and 60 minutes) include all numbers subsumed within that range, for example, between about 1 minute and 60 minutes includes 21, 22, 23, and 24 minutes as endpoints within the specified range. Thus, for example, ranges 22-36, 25-32, 23-29, etc. are also ranges with endpoints subsumed within the range 1-60 depending on the starting materials used, temperature, specific applications, specific embodiments, or limitations of the claims if needed. The Examples and methods disclosed herein demonstrate the recited ranges subsume every point within the ranges because different synthetic products result from changing one or more reaction parameters. Further, the methods and Examples disclosed herein describe various aspects of the disclosed ranges and the effects if the ranges are changed individually or in combination with other recited ranges.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

As used herein, the term "about" and "approximately" are defined to being close to as understood by one of ordinary skill in the art. In one non-limiting embodiment, the term "about" and "approximately" are defined to be within 10%, preferably within 5%, more preferably within 1%, and most preferably within 0.5%.

EXAMPLES

Example I: Synthesizing BNNT-Encapsulated $MoS_2$ Nanoribbons

First, a solution was prepared by dispersing about 5 mg of BNNTs in 25 mL of dimethylformamide (DMF). Then, about 10 mg of ammonium tetrathiomolybdate was dissolved in the solution. However, it was determined that about 5 mL of a water solution containing 10 mg/mL ammonium molybdate and/or about 5 mL of a water solution containing 10 mg/mL sodium molybdate could be used in addition to or instead of the ammonium tetrathiomolybdate.

The solution was then heated to 130° C. under reflux for 2 hours such that a first precursor was encapsulated within the BNNTs.

The encapsulated first precursor was then separated from the solution with centrifuge and washed with isopropyl alcohol three times, then dried under vacuum to provide a first precursor powder. The first precursor powder was then provided within a tube furnace downstream of a sulfur powder. The sulfur powder was heated to about 200° C. sufficient to provide a vapor, which was directed to the first precursor powder with an argon gas flow at a flow rate of 80 sccm. The first precursor powder was heated to about 900° C. for 30 minutes in the presence of the vapor to provide BNNT-encapsulated $MoS_2$ nanoribbons.

Figure 7A:
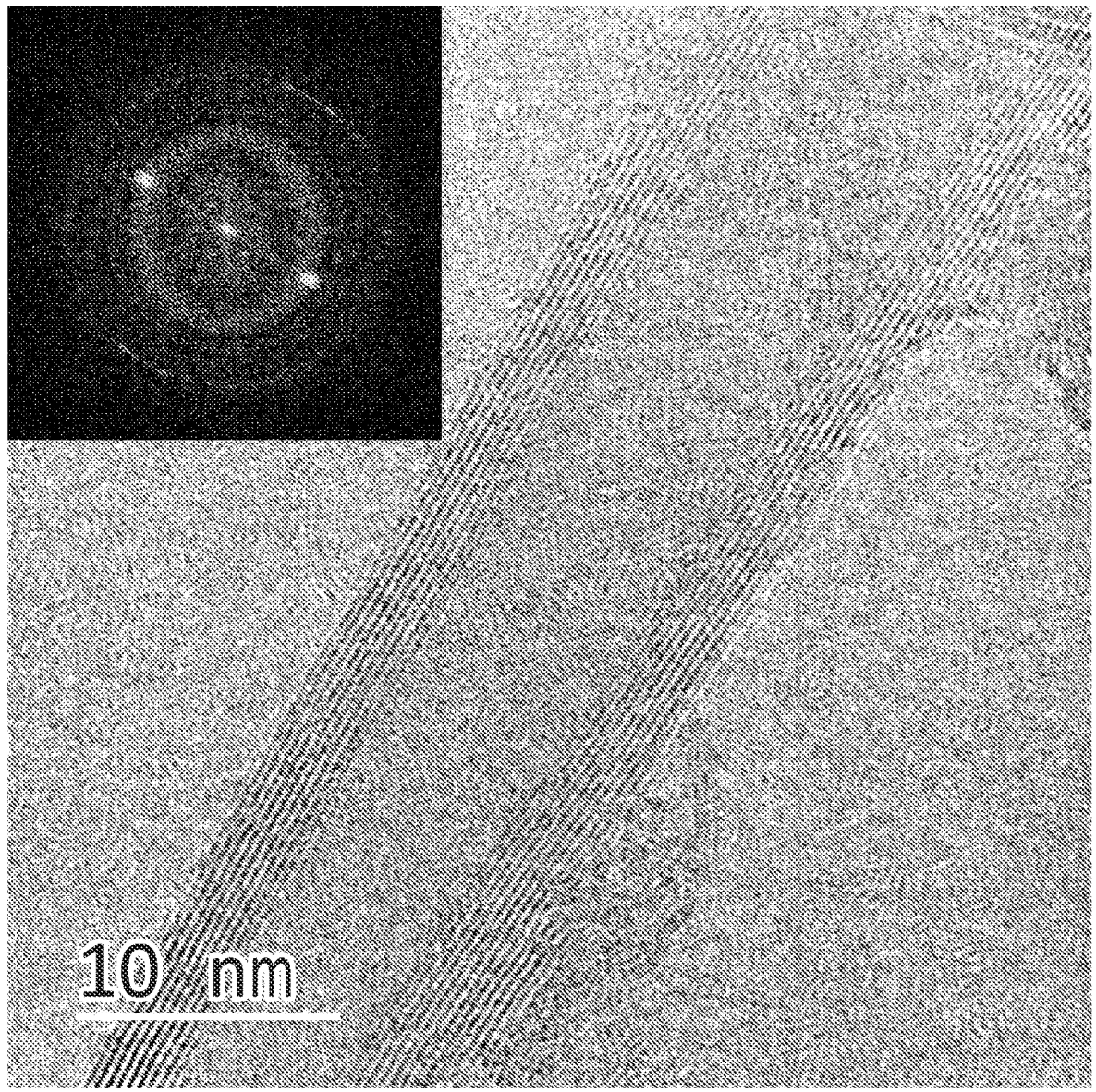
FIG. 7A shows a TEM image of a pure BNNT, as described in Example I.
Figure 7B:
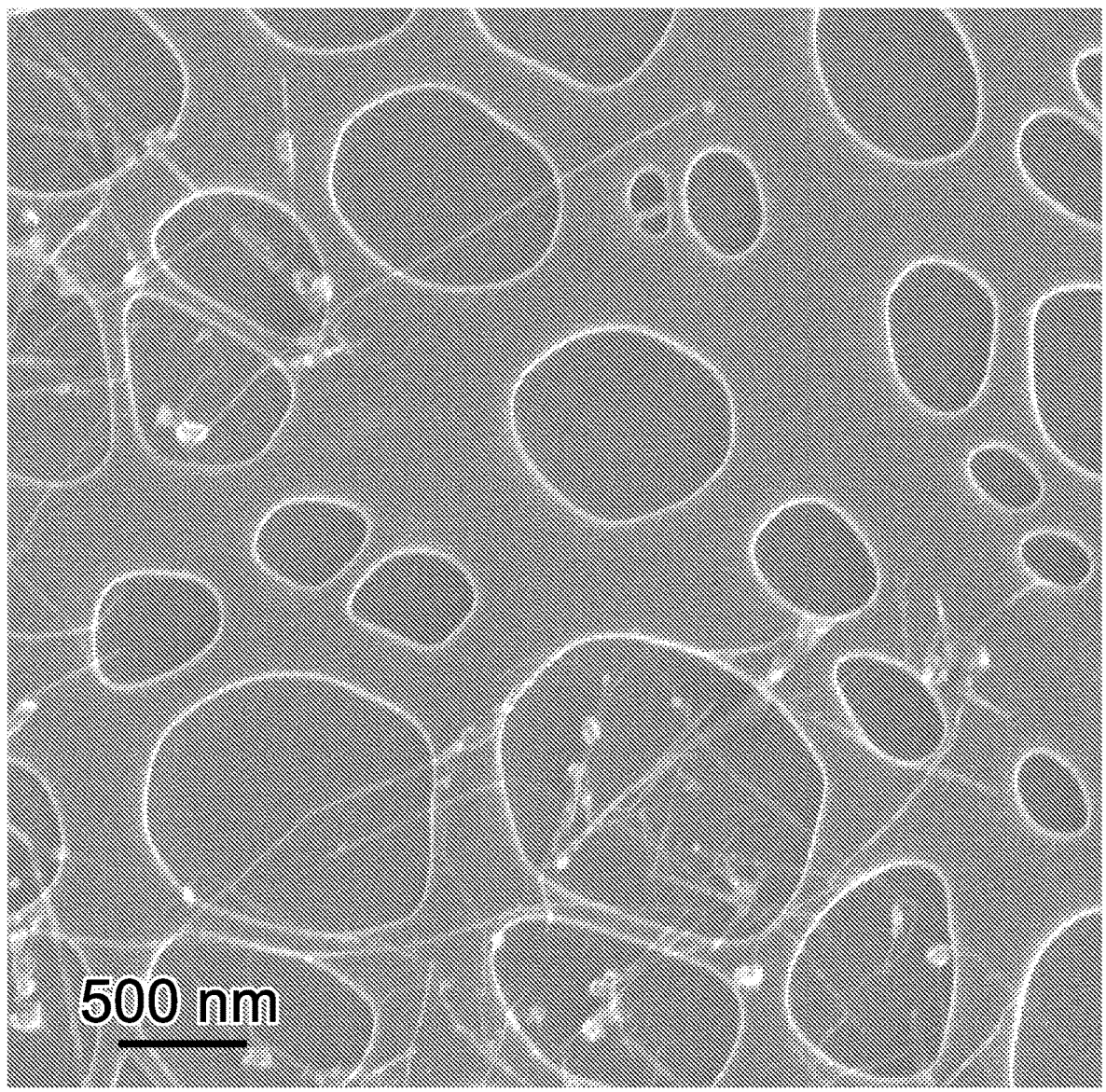
FIG. 7B shows an SEM image of the BNNT-encapsulated $MoS_2$ nanoribbons prepared according to Example I.
Figure 7C:
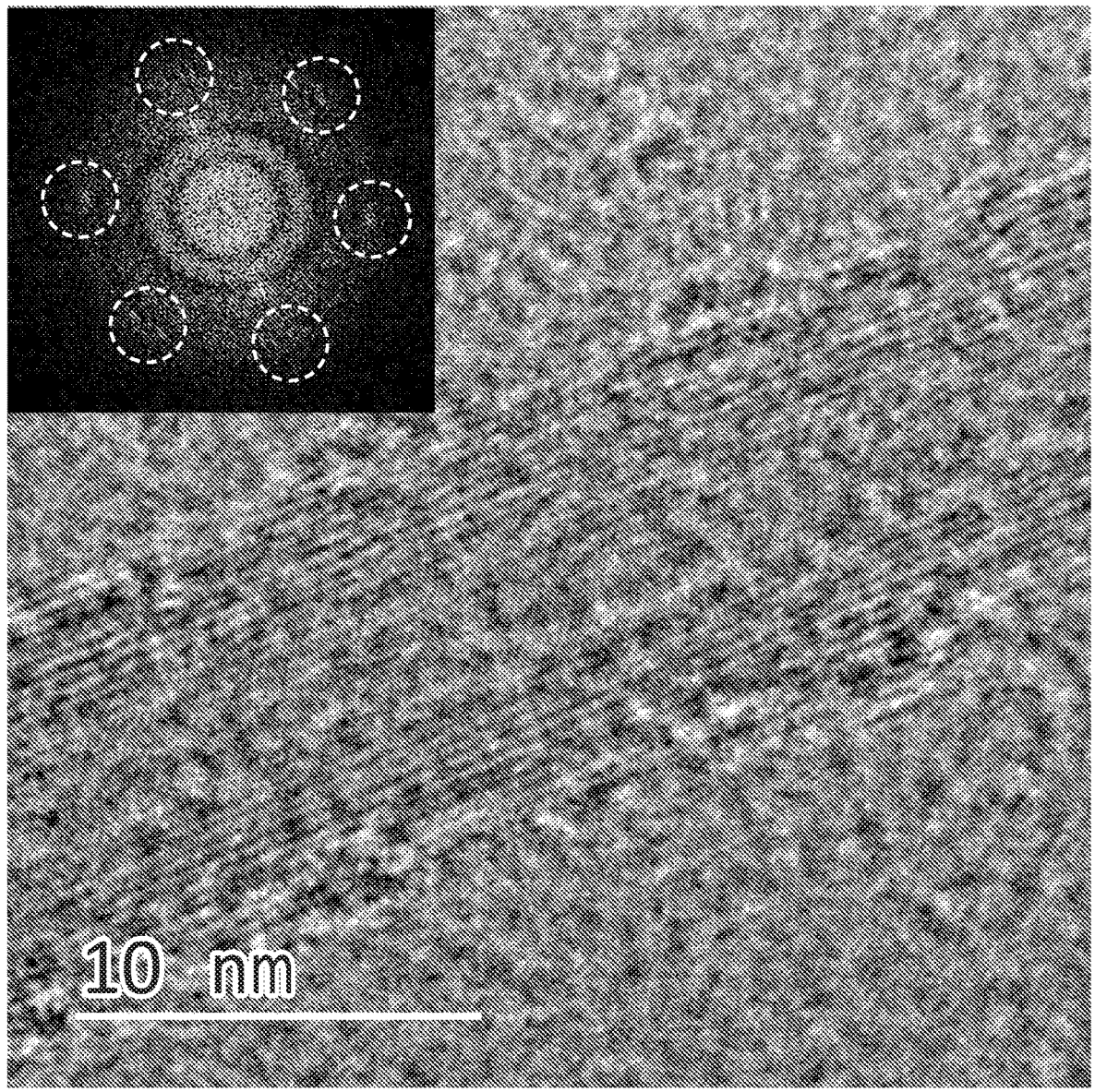
FIG. 7C shows a TEM image of the BNNT-encapsulated $MoS_2$ nanoribbons prepared according to Example I.

Encapsulation of the nanoribbons was confirmed using transmission electron microscopy (TEM) and scanning electron microscopy (SEM). In particular, FIG. 7A shows a TEM image of a pure BNNT (i.e., not having a nanoribbon therein). Inset is the electron diffraction pattern of a BNNT. FIG. 7B shows an SEM image of the BNNTs prepared according to this example. As shown in FIG. 7B, the BNNTs have $MoS_2$ nanoribbons encapsulated therein. FIG. 7C shows a TEM image of the BNNT-encapsulated $MoS_2$ nanoribbons prepared according to this example. Inset is the electron diffraction patterns for both the BNNTs and the $MoS_2$ nanoribbons (i.e., the hexagonally arranged spots indicated by dashed circles).

What is claimed is:

1. A method of making an encapsulated nanoribbon comprising:
   reacting an encapsulated first precursor with a second precursor to provide an encapsulated nanoribbon, wherein reacting the encapsulated first precursor with the second precursor comprises contacting the encapsulated first precursor with a vapor of the second precursor at an elevated temperature for a time period sufficient to provide the encapsulated nanoribbon.

2. The method of claim 1, wherein the encapsulated first precursor comprises a transition metal salt.

3. The method of claim 1, wherein the encapsulated first precursor is encapsulated by a nanotube, the nanotube comprising a dielectric material.

4. The method of claim 3, wherein the dielectric material comprises hexagonal boron nitride.

5. The method of claim 1, wherein the second precursor comprises a chalcogen.

6. The method of claim 1, wherein the elevated temperature is between about between about 700 and 1100° C.

7. The method of claim 1, wherein the time period is between about 1 and 60 minutes.

8. A method of making an encapsulated nanoribbon comprising encapsulating a first precursor within a nanotube to provide an encapsulated first precursor, and
   reacting the encapsulated first precursor with a second precursor to provide an encapsulated nanoribbon.

9. A method of making an encapsulated nanoribbon comprising heating at least a first precursor in the presence of a nanotube to an elevated temperature for a time period sufficient to form an encapsulated nanoribbon, wherein the first precursor comprises a transition metal dichalcogenide.

10. The method of claim 9, wherein the elevated temperature is between about 500 and 1400° C.

11. The method of claim 9, wherein the first precursor and nanotube are heated to the elevated temperature in a reduced pressure environment.

12. The method of claim 9, wherein the first precursor is heated in the presence of a second precursor and a nanotube.

13. The method of claim 12, wherein the first precursor comprises a transition metal oxides and the second precursor comprises a chalcogen.

* * * * *